United States Patent Office 3,517,256
Patented June 23, 1970

3,517,256
SHOCK-WAVE GENERATOR
Spartacus Barbini, Chaville, Hauts de Seine, France, assignor to Compagnie Generale d'Electricite, Paris, France
Filed Feb. 21, 1967, Ser. No. 617,516
Claims priority, application France, Feb. 22, 1966
50,635
Int. Cl. H05b 37/00; H01s 1/00; H01t 15/00
U.S. Cl. 315—155                                    23 Claims

ABSTRACT OF THE DISCLOSURE

A high voltage shock wave generator formed by a plurality of distinct, removable units, each comprising an arcing chamber enclosing two electrodes defining a spark-gap, the arcing chambers being assembled in a vertically suspended column, the partitions separating two consecutive chambers having aligned transparent portions, said generator further comprising a control means including a laser disposed so that its luminous beam passes in the space between the electrodes of at least one of said spark-gaps.

BACKGROUND OF THE INVENTION

The present invention relates to very high voltage shock wave generators such as those used for testing high voltage line equipment or for carrying out experiments in the field of physics.

FIG. 1 schematically shows a circuit (the so-called "Marx" circuit) used in certain known generators. This circuit comprises a plurality of capacitors $C_1$, $C_2$, $C_3$, $C_4$ series-connected through spark-gaps $e_1$, $e_2$, $e_3$. The capacitors C are charged in parallel through resistors $R_1$, $R_2$, $R_3$, $R_4$, $R_5$, $R_6$ by a direct current source S. When the voltage of the capacitors is higher than the break-over voltage of the spark-gaps, electric arcs are triggered and the capacitors are discharged in series. The voltage at the terminal 1 has the shape of a shock-wave and a peak-value substantially equal to the sum of the voltages of the capacitors.

In the generators known heretofore, the capacitors are generally supported by one or several vertical poles or by helicoidally shaped supports. Known generators comprise a plurality of spark-gaps assembled in a column suspended from a travelling crane, the high voltage terminal being located at the lower part of the hanging column. In this case, the capacitors are formed by cylindrical tubes, located one above the other, and rigidly secured to the column or to auxiliary support members.

The construction of the above described known generators present many difficulties.

The problems are created by the fact that the disruptive voltage of the spark-gaps cannot be controlled or regulated, which is necessary since the obtention of a shock wave having desired characteristics is possible only if the discharge of each of the spark-gaps is controlled with great precision in time.

It has been proposed to use auxiliary triggering devices such as those known as "trigatrons" but these devices do not prove satisfactory as far as timing is concered.

The object of the present invention is to provide a shock wave generator obviating the above-mentioned drawbacks and which is easy to assemble, to displace, to dismantle and easy to adjust to obtain a shock wave having determined shape and power, etc.

SUMMARY OF THE INVENTION

The generator according to the present invention is essentially characterized by the fact that it comprises a plurality of distinct removable units, each comprising an arcing chamber enclosing two electrodes defining a spark-gap, the arcing chambers being assembled in a vertically suspended column, the partitions separating two consecutive chambers having aligned transparent portions, and control means including a laser disposed so that its luminous beam passes in the space between the electrodes of at least one of said spark-gaps.

DESCRIPTION

Various features and advantages of the generator according to the invention will be apparent from the following description referring to the attached drawings, wherein.

Figure 2:
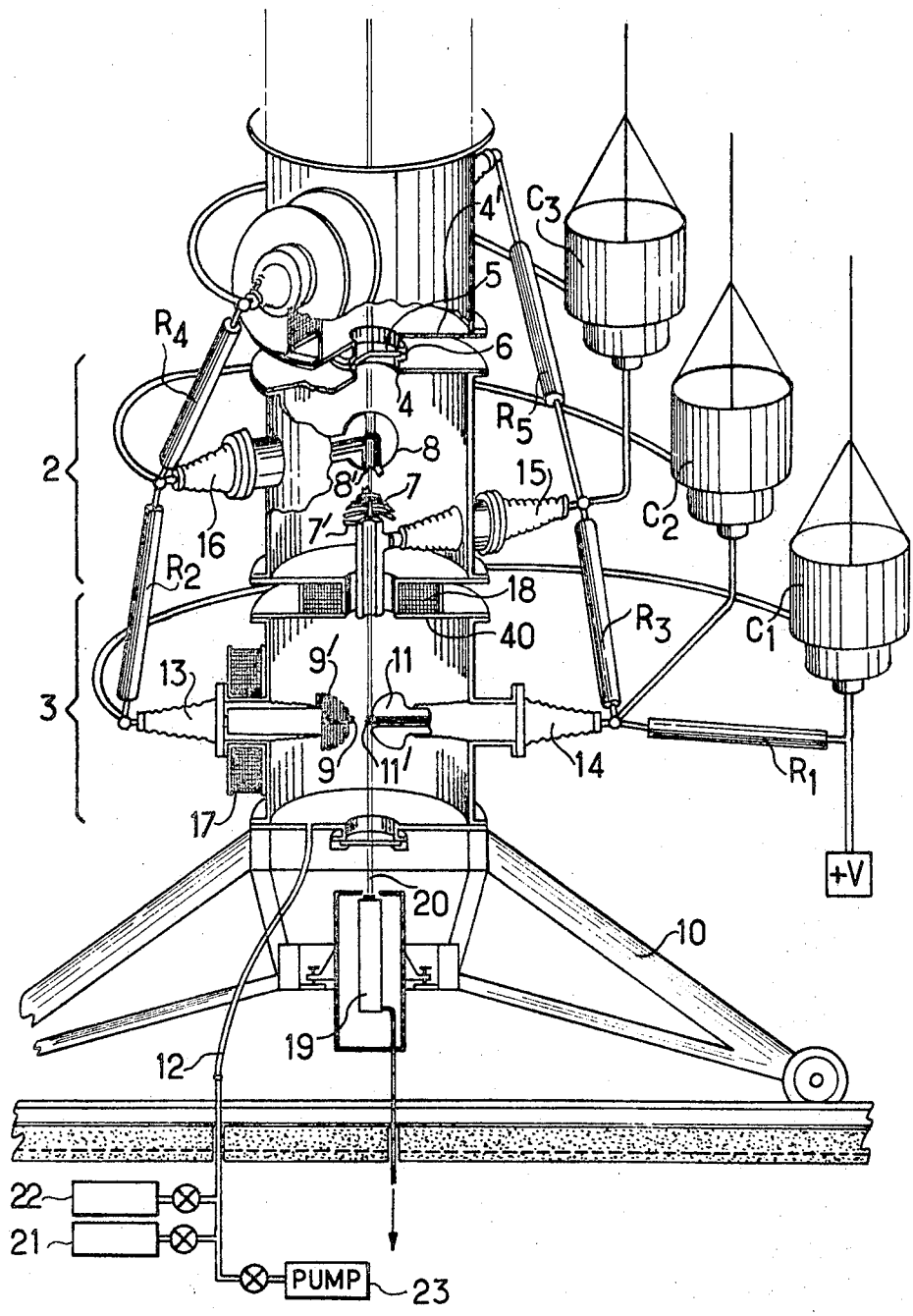
FIG. 2 is a perspective view of a part of a generator constructed according to the invention.

The generator according to the invention comprises a hanging hollow column attached to a travelling crane (not shown in FIG. 2). The base of the column may be supported by a carriage such as that shown at 10. The hollow column is made of an insulating material having satisfactory mechanical and electrical properties. For example the column can be made of any synthetic material having sufficient mechanical strength or of fiberglass impregnated with synthetic material such as a polyester. This column comprises a plurality of removable units as shown at 2 and 3, separated by connecting elements such as shown at 4 including fluid-tight seals 6. The electrodes (9–11 for example) forming the spark-gaps are supported by bushings 13, 14, 15 and 16 and connected in series through capacitors $C_1$, $C_2$ and $C_3$. According to a preferred embodiment of the invention the capacitors are suspended by insulating cables, made of nylon for example, to electrically driven winches or hoists supported by a movable runway allowing displacement or removal of these capacitors.

Preferably the capacitors are disposed along a helix around the column.

The fixation of the upper part of the column to a travelling crane produces a column having a perfect vertical orientation which is necessary for correct and precise alignment of the units such as 2 and 3. The crane supporting the upper part of the column and the capacitors allows displacement of the whole assembly, the removal of the units forming the lower part of the column or the removal or replacement of some or all the capacitors. The use of a supporting carriage 10, moving on a rail track, enables the removal and/or the replacement of the unit forming the upper part of the column.

Thus the characteristics of the generator can be readily modified by changing the capacitors or by replacement of one or several units such as 2 and 3 by other units having different electric characteristics. With a stock of a relatively small number of units it is possible to obtain a generator having a relatively wide power range.

The elements connecting two consecutive units can be formed by two walls 4–4' having a central aperture which may comprise a transparent fluid tight plate 5. The walls 4 and 4' are assembled together by means of flanges provided with fluid tight sealings 6.

Each of the units such as 2 and 3 can be supplied with a dielectric gas under pressure or a vacuum. This can be carried out for example by means of a duct 12 connecting the inner space of the unit 3 with gas supply means schematically shown at 21–22 or with vacuum pumping means 23. The gas supply means contain a single gas such as nitrogen of sulphur hexafluoride, or a mixture thereof or any other gas having suitable dielectric properties.

As mentioned above, each of the units, such as 2 or 3, comprise two electrodes defining a spark-gap. In the embodiment illustrated in FIG. 2 there is an alternate series of axial spark-gaps (that is having electrodes, such as 7–8, disposed along the axis of the column) and transversal spark-gaps (the electrodes, such as 9–11, being located at either side of this axis). It is to be noted, however, that in certain cases it is advisable to have a homogeneous generator with a series of spark-gaps of the same type.

Each spark-gap comprises at least one conventional triggering device for triggering the electric arc between the electrodes. As examples only three types of triggering device will be mentioned herein. A first one, commonly known as "trigatron," is usually used in spark-gaps working with easily ionizable gaseous atmosphere and when the distance between electrodes is not too great (for example to 5 centimeters for a voltage of about 200 kilovolts).

A "trigatron" usually comprises an auxiliary electrode which is shown for example at 11', associated with a normal electrode such as that shown at 11 in the unit 3. This auxiliary electrode is connected to a signal generator (not shown in the figure) capable of supplying, at a precisely defined time, a voltage pulse of sufficient magnitude to produce a spark which ionizes the gas in the vicinity of the electrode 11 thereby initiating an arc between the electrodes 9 and 11.

Another triggering device is that described in the applicant's pending application Ser. No. 532,680 filed on Mar. 8, 1966. This device comprises a pulse transformer having a primary winding 17 (FIG. 2) coaxially disposed with the bushing 13 and the electrode 9 and a secondary winding 9'. The winding 9' is a part of the electrode 9 itself and is made of a conductor forming a loop or at least one turn around a central part of the electrode 9, one end of the conductor being connected to said central part, the other end being free and located at a relatively short distance from the end of said central part. When the winding 17 is supplied with a high intensity current pulse, a high voltage is induced in the conductor 9' and a spark appears between the extremities of 9 and 9' thereby ionizing the gaseous medium and initiating an arc between 9 and 11.

A similar triggering device can be used with electrodes disposed along the vertical axis. This is shown in the unit 2 where the axial spark-gap exists between electrodes 7 and 8. The electrode 7 is made up by a loop or turn such as the conductor 9' of the electrode 9. This loop or turn forms the secondary winding of a transformer the primary winding of which, shown at 18, is disposed around the connecting element 40 forming a cover for the units 2 and 3.

The electrode 7 may comprise an element, such as that shown at 7', made of a magnetic material to help in concentrating the magnetic field line produced by the winding 18.

It is to be noted that the winding 18 produces a magnetic field which is perpendicular to the field created by the winding 17. Thus the winding 17 cannot induce any current in the conductor of the electrode 9 and the same is true of the winding 18, which cannot interfere with electrode 9. Preferably, the conductors such as 9' are metallic bands, of copper, bronze or bronze-glucinum alloy or the like, imbedded in an ovoidal mass of an insulating and resistant material such as fiberglass or a polyester or a combination of fiberglass with a thermosettable synthetic material.

The free end of the conductor 9' is preferably made entirely or partially of tungsten or tungsten alloy.

The other electrodes or parts of the electrodes of the spark-gaps are preferably made of brass with end-parts made of "cuniten" that is an alloy of copper, nickel and tungsten. It is also possible to cover the electrodes, or certain parts of the electrodes, with a layer of a body capable of producing an intense thermionic or thermoelectric electron emission thereby improving the efficiency of the spark-gap triggering devices.

Another triggering device is that described in the applicant's U.S. Pat. 3,295,012 issued on Dec. 27, 1966 and patent application Ser. No. 406,866 filed on Oct. 27, 1964.

This triggering device comprises a laser 19 (FIG. 2) so located that the high energy luminous laser beam 20 passes through the space between the electrodes of one or more of the spark-gaps forming the generator of the invention. This luminous beam focused or not, partially ionizes the gaseous medium of the spark-gap, thereby initiating the arc between the electrodes. According to certain embodiments, a part of the luminous beam can be deviated for impinging, with or without focusing, one or more electrodes or counterelectrodes located in the vicinity of the electrodes. The laser beam being a very high density electromagnetic radiation provides a very strong electrical field capable of tearing away free electrons of the electrodes provided the latter are close enough to the beam. Therefore the laser type triggering device does not necessarily work in gaseous medium but also can initiate an arc in a vacuum.

In order to provide a passage for the laser beam, the electrodes such as 8, located along the axis of the column have axial apertures or channels as shown at 8'.

The use of laser type triggering devices results in many advantages especially the synchronized triggering of several spark-gaps.

The quasi-simultaneous triggering of all the spark-gaps of the generator provides a steep rising flank shock wave.

According to a preferred embodiment of the invention the generator comprises a plurality of stages, each being formed by the combination of a unit such as 2 with a unit such as 3.

Preferably each spark-gap is provided with at least two different triggering devices. Since each of these triggering devices has a different time characteristic, it is possible to provide a generator which can produce a great variety of shock waves as far as the shape and power of these waves is concerned. The distance between the electrodes can be adjustable; however, this adjustment is usually difficult to carry out and it is preferable to fix the distance once and for all for a given unit, and vary the other parameters.

The first unit (that is the lower unit 3) preferably comprises a "trigatron" type triggering device and/or a pulse-transformer type device (17–9'). The other units have the same or other triggering devices in accordance with the desired triggering characteristics. It is to be noted that the use of laser beam triggering device is an essential part of the invention and the presence of additional triggering devices for the second and following units can be optional if the laser beam is adjusted for triggering the last mentioned units.

Advantageously the upper unit is closed by a cover having a transparent central opening for letting the laser beam out of the column. A detector sensitive to the luminous beam (for example a photoelectric cell or a photo multiplier) is then disposed in the path of the laser beam and connected to an electronic control circuit controlling the other triggering devices.

The electronic control circuit, controlling the laser as well as the other triggering devices is preferably located in a chamber arranged in the ground and separated from the generator by walls made of concrete eventually with metallic partitions. Such an arrangement may prove necessary for avoiding any electrostatic or electromagnetic disturbance caused by the very high electric and magnetic field surrounding the generator. It is to be noted that the generally coaxial structure of the generator reduces such inconvenience.

As mentioned above the distance between the electrodes is preferably adjusted once and for all: the output of the generator can be increased or decreased by changing the capacitors and by controlling the disruptive or break down voltage of each spark-gap through adjustment of other parameters such as pressure in the various chambers, or the nature of the medium in these chambers.

In principle the pressure can vary in the range of $10^{-3}$ mm. Hg to 6 kg. The gas which is used can be any inert gas (for example, xenon, argon) or an electronegative gas such as $SF_6$, or nitrogen, hydrogen, air, etc. or any other mixture of suitable dielectric fluid without excluding the possibility of using certain liquids.

Mixtures of gases such as hydrogen and $SF_6$ can be used. The use of sulphur hexafluoride is particularly advantageous: $SF_6$ is usually known for its arc extinguishing properties and is generally used in fuses of circuit breakers. In the case of a generator according to the invention, $SF_6$ makes possible the reduction of the distance between the electrodes up to about 6 mm. for a voltage in the order of 120 kilovolts.

The reduction of the distance between the electrodes presents considerable advantages: a shorter distance between the electrodes leads on one hand to a faster discharge of the capacitor (provided the triggering device is efficient) and on the other hand to a greater efficiency of the laser type triggering device.

The generator of the invention can be controlled by simultaneous energizing of several distinct triggering devices of a same spark-gap, and the efficiency of one of said devices is still increased by the other and vice-versa.

In certain cases it may be advantageous to increase the efficiency of the triggering devices without substantially decreasing the dielectric rigidity of the gaseous medium: this can be achieved by addition of about 10% of hydrogen to the sulphur hexafluoride.

It is to be noted that several units (2, 3) can be pre-assembled since the precise alignment of the units can be achieved on the ground provided the number of units does not exceed two or three. The travelling crane and the carriage make possible to carry out the alignment of two or three preassembled stages further by making use of the forces of gravity.

The flexibility of the use of the generator of the invention is partly due to the fact that each unit or each stage can present distinct characteristics: one unit can be under vacuum, another filled with $SF_6$, another filled with air under pressure, etc. In each stage, the triggering device used is the one that presents the most favorable characteristics taking into account the shape and power desired for the resulting shock wave.

The number of units forming the generator of the invention essentially depends upon the desired power: for example, it is possible to obtain a peak voltage of $10^6$ to $5.10^6$ volts with an energy of 100 to 700 kilojoules by using units producing each 400 kilovolts with capacitors charged at 200 kilovolts.

Figure 1:
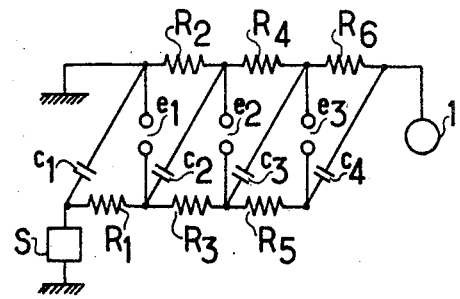
FIG. 1 is a schematical representation of the known circuit of the generator according to the present invention.
Figure 3:
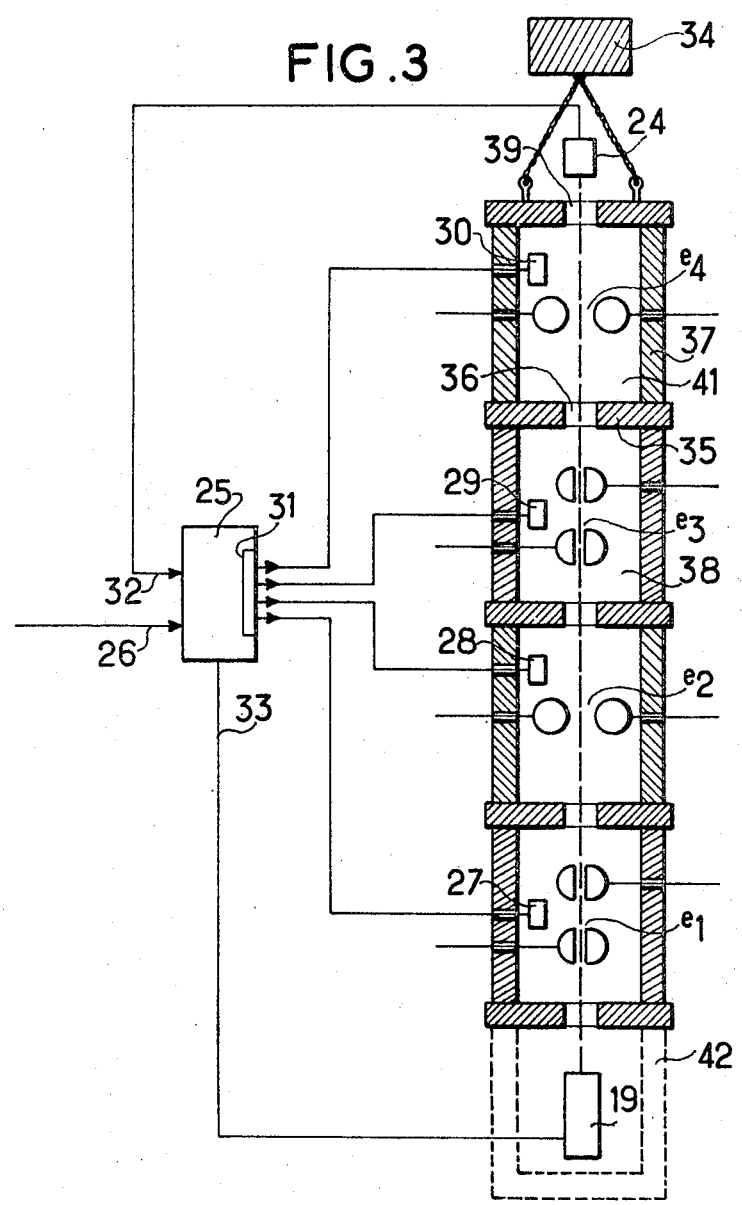
FIG. 3 is a simplified sectional view of the generator according to the invention.

The FIG. 3 shows a very simplified sectional view of a generator according to the invention. The capacitors are not shown in this figure and the same elements are referred to by the same reference numerals as in FIGS. 1 and 2.

The generator comprises a plurality of arcing chambers such as 41 formed by units, each comprising a lateral wall 37 and separating means 35 having a central opening or aperture 36. The generator is suspended by any known means from the ceiling or from a travelling crane schematically shown at 34. The auxiliary triggering devices, that is known devices such as the "trigatrons" or the devices described in the patent applications referred to hereinabove are schematically shown at 27, 28, 29, 30. These auxiliary triggering devices are connected to the output terminals 31 of a control circuit 25 which is a conventional control circuit. A laser 19 is shown at the lower part of the column whereas a detector 24 sensitive to luminous beams is disposed at the other end of this column.

It is to be understood that the laser can be placed at the upper part of the generator and the detector at the lower part. However, the first disposition is preferred since the access to the laser is then easier.

According to another embodiment of the invention, the laser 19 can be placed inside a unit, such as the unit 42 shown in dotted line. This unit 42 can be of the same construction as the other unit. It also can comprise additional metallic partitions which will provide the unit with the properties of a Faraday cage protecting the laser from electromagnetic and electrostatic interferences. Detector 24 is operatively connected to an input terminal of the control circuit 25. Laser 19 is connected to the terminal 33 of the control circuit 25 which also comprises a manual control means schematically illustrated by the arrow 26.

The generator of the invention can operate in different ways in accordance with the desired characteristics of the shock wave.

According to a first way, the laser 19 is controlled by circuit 25 through the manual control means 26. At the same time, or with a predetermined delay, the circuit 25 controls the operation of each of the auxiliary triggering devices 27, 28, 29 and 30. A different operation of the generator can be obtained by adjusting the control circuit so that the auxiliary triggering devices 27, 28, 29 and 30 are first energized, the laser being energized with a predetermined delay. It is also possible to energize the laser alone: the arrival of the luminous beam on the detector 24 causes the excitation of the input terminal 32 of the control circuit 25, which then controls the operation of the auxiliary triggering devices 27, 28, 29 and 30.

In summary, the most important characteristics of the generator of the invention are:

(a) the suspension of replaceable capacitors;
(b) the use of interchangeable units forming distinct arcing chambers enclosing each one spark-gap means;
(c) the particular means for interconnecting the units;
(d) the suspension of the column;
(e) the use of a laser beam with or without combination with auxiliary known triggering devices;
(f) the adaptation of the known triggering devices to the structure of the column;
(g) the use of fluid-tight distinct arcing chambers;
(h) the use of gas-supply means and pumping means.

It is common knowledge that a shock wave generator can be used under different conditions and the power, the voltage, the current and the shape of the shock wave may be adjusted for each particular use.

A shock wave generator is an expensive installation of relatively great over-all size and the electrical performances are as important to the eyes of the user as the flexibility of use and the simplicity of the technological problems to be solved.

No previously known generator can simultaneously and satisfactorily solve the problems related to the technology, the cost and the over-all size.

The generator according to the invention being formed by standardized units can be assembled at will for and/or by the user. In accordance with the particular needs of the user, the basic element of the generator is either a single arcing chamber or a couple of arcing chambers of which one has an axial spark-gap, the other having a transverse spark-gap. Such a couple can be assembled on the ground with great mechanical precision and the assembly of several couples is simplified by the fact that the column is suspended. The suspension of this column solves other technological problems. It is now possible to use materials having significant tensile strength which materials are different from those intended to resist compression. The user, once he owns several interchangeable units, can easily build the generator which will be the most adequate for the problems to be solved. Once the column is built, the user may change the power of the generator by changing the capacitors without having to adjust any element of the column. The user can also take away one or more units of the lower part of the column without having to modify the structure of the upper part of the column.

The manufacturing cost of standardized units is much lower and the manufacturer can have a permanent stock of units which will be assembled only at the time a customer orders the construction of a particular generator.

The electrical characteristics of the generator of the invention can be adapted to any situation known today. These electrical characteristics can be modified as follows:

(a) as mentioned above, the distance between electrodes is preferably kept constant, once the generator is assembled. However, it is obvious that means can be provided for adjusting this distance at the time of the assembly of the units, and even after;

(b) the electrodes can be interchangeable;

(c) auxiliary devices can be provided for using the laser beam in different ways (counter-electrodes, focusing means, means for deviating the beam, and so on);

(d) one or more arcing chambers or the walls separating two consecutive chambers may include devices introducing a predetermined delay in the propagation of the luminous beam;

(e) the velocity of the luminous beam and the disruptive voltage of each spark-gap can be modified by changing the gaseous medium;

(f) as described above, the timing of the operation of different auxiliary triggering devices can be adjusted at will and efficiency of the triggering of the electric arc can be increased by the combination of two or more triggering devices in each spark-gap.

Many other advantages of the generator of the invention are not described in the present specification since they are inherent to the structure described above or are inherent to certain modifications obvious to any one skilled in the art.

I claim:

1. A shock wave generator of the type having a plurality of spark-gaps in circuit connection with condensers and resistors for energizing the same, said generator comprising: a plurality of demountable superimposed arcing chamber units forming a column, means for vertically suspending said column, each chamber enclosing spark-gap means, common removable partition means for separating consecutive chambers including a central aperture, with the central apertures being aligned along a common axis, one end chamber of said column having an aperture provided in the outer wall, aligned with said central apertures, and laser means having its luminous beam merged with said axis whereby said beam passes at least partially through the space between the electrodes of respective spark-gap means.

2. The shock wave generator according to claim 1, wherein each of said arcing chambers is formed by a substantially cylindrical lateral wall having end flanges and two terminal walls, and means including said terminal walls to form fluid-tight cover means for said lateral wall, and a central aperture formed within said lateral wall.

3. The shock wave generator according to claim 2, wherein at least one of said terminal walls comprises a substantially plane portion having an aperture and a cylindrical portion perpendicular to said plane portion and secured thereto by one end, a flange formed on the other end and said aperture facing the inner space of said cylindrical portion.

4. The shock wave generator according to claim 1, wherein said arcing chambers include two terminal walls, each comprising a substantially plane portion having an aperture and a cylindrical portion, perpendicular to said plane portion and secured thereto by one end, a flange on the other end, said aperture facing the inner space of said cylindrical portion, and means for assembling the two terminal walls by their flanges and forming said partition means separating two consecutive chambers.

5. The shock wave generator according to claim 1, further including transparent fluid-tight plate means for closing the aperture of said partition means.

6. The shock wave generator according to claim 1, wherein said spark-gap means comprises a plurality of transverse spark-gaps, and a plurality of axial spark-gaps with the electrodes of the axial spark-gap means including axial apertures for the passage of said luminous beam.

7. The shock wave generator according to claim 6, wherein said transverse and axial spark-gaps are alternated in series.

8. The shock wave generator according to claim 6, wherein one arcing chamber is gas-tight, and said generator further includes pumping means for adjusting the pressure within said gas-tight arcing chamber.

9. The shock wave generator according to claim 8, further including means for supplying at least one gas of the group consisting of argon, xenon, nitrogen, hydrogen, air and sulphur hexafluoride to said gas-tight arcing chamber.

10. The shock wave generator according to claim 1, wherein said chambers are grouped by stages, each comprising two chambers, an axial spark-gap means for one of said chambers and transverse spark-gap means for said other chamber, means for securing two consecutive stages together by a dismountable partition means, and means for suspending said column by one of its ends.

11. The shock wave generator according to claim 1, wherein each of said spark-gap means further includes a triggering spark generator.

12. The shock wave generator according to claim 11, wherein the other of said end chambers includes a transparent portion in its outer wall, and said generator further includes a luminous beam detector disposed outside of said column for receiving said beam passing through said transparent portion.

13. The shock wave generator according to claim 12, further including a control circuit for connecting said triggering spark generator to said detector.

14. A shock wave generator according to claim 1 further comprising photoelectric detector means disposed in the path of said luminous beam downstream of the last of said spark-gaps, and a control circuit for coupling said detector means to said auxiliary arc triggering means for controlling at least one auxiliary arc triggering means disposed within a respective arcing chamber unit.

15. The shock wave generator according to claim 1 wherein each of said arcing chambers comprises a lateral wall and two gas-tight covers secured respectively to the ends of said lateral wall, one of said covers forming said partition means for separating two consecutive chambers and comprising two substantial plane walls connected by a tubular portion defining said central aperture, one of said chambers adjacent to one of said covers encloses an axial spark-gap means, said axial spark-gap means having two electrodes supported respectively by bushings secured to the lateral wall, means for aligning said electrodes with the axis thereof, and said chamber further includes axial borings for the passage of said luminous beam and a trigger-sparked generator and means for operatively coupling said trigger-sparked generator to one of said electrodes.

16. The shock wave generator according to claim 15, further including a circuit having a transformer in which the secondary winding of the transformer is connected to the triggering spark generator and the primary winding is disposed around the tubular portion connecting the substantially plane walls.

17. The shock wave generator according to claim 16, further including a conductor, one end of which forms an auxiliary electrode and means for connecting the other end of said conductor to said electrode whereby said conductor forms said secondary winding is the triggering spark generator is formed by the electrode itself and the auxiliary electrode formed by said one conductor end.

18. The shock wave generator according to claim 16, further including a body of magnetic material disposed inside said tubular portion defining said aperture for cancelling the magnetic field generator by said primary winding.

19. The shock wave generator according to claim 16, wherein said triggering spark generator comprises an ignition plug type generator.

20. The shock wave generator according to claim 1, wherein the spark-gap means for at least one chamber is of the transverse type, formed by two electrodes disposed at either side of said axis, said chamber further includes bushings passing through the lateral wall of said chamber for supporting said two electrodes, and a triggering-spark generator operatively associated with said transverse spark-gap means, and said generator further includes a circuit having a transformer including the secondary winding coupled to said triggering spark generator and a primary winding disposed around one of said bushings outside said chamber.

21. The shock wave generator according to claim 20, further including a conductor, one end of which forms an auxiliary electrode, and means for connecting the other end to the electrode itself, whereby said electrode and said conductor forms said triggering spark generator with said conductor forming said secondary winding.

22. The shock wave generator according to claim 1, wherein said arcing chambers are made of a synthetic material.

23. The shock wave generator according to claim 1, wherein said arcing chambers are made of a material comprising fiberglass.

References Cited

UNITED STATES PATENTS

| | | | |
|---|---|---|---|
| 3,398,322 | 8/1968 | Guenther | 315—150 |
| 3,141,111 | 7/1964 | Godlove | 315—150 |
| 3,169,208 | 2/1965 | Harrington | 315—189 |
| 3,382,402 | 5/1968 | Lafferty | 315—189 |

JERRY D. CRAIG, Primary Examiner

U.S. Cl. X.R.

315—36, 156